United States Patent
Ikemori

[11] 3,947,094
[45] Mar. 30, 1976

[54] RETRO-TELECENTRIC LENS
[75] Inventor: Keiji Ikemori, Kawasaki, Japan
[73] Assignee: Canon Kabushiki Kaisha, Tokyo, Japan
[22] Filed: Mar. 11, 1974
[21] Appl. No.: 450,237

[30] Foreign Application Priority Data
Mar. 15, 1973  Japan.............................. 48-30428

[52] U.S. Cl........................... 350/214; 350/175 TS
[51] Int. Cl.²..................... G02B 9/64; G02B 13/22
[58] Field of Search............... 350/175 TS, 214, 225

[56] References Cited
UNITED STATES PATENTS
2,651,970  9/1953  Tiller...................... 350/175 TS X
2,830,495  4/1958  Koch et al. .................... 350/216 X FOREIGN PATENTS OR APPLICATIONS
1,467,132  12/1966  France............................... 350/214

*Primary Examiner*—John K. Corbin
*Attorney, Agent, or Firm*—Toren, McGeady and Stanger

[57] ABSTRACT

A retro-telecentric lens having a divergent lens group at an object side and a convergent lens group at an image plane side, wherein the back focus of the entire lens is longer than the focal distance and the diaphragm coincides with the position of the focal point at an object side, and an optical member being composed of two lenses, which satisfy a predetermined relationship between dispersion and power and the cemented surface of said two lenses faces the object side, is positioned between the above mentioned divergent lens group and the convergent lens group, thereby inward and outward coma aberration is satisfactorily corrected.

2 Claims, 10 Drawing Figures

LARGE ANGLE

SMALL ANGLE

RETRO-TELECENTRIC LENS

BACKGROUND OF INVENTION

The present invention is related to a retrotelecentric lens in which lateral aberration is highly corrected and back focus is longer than focal distance.

An optical system of telecentric type must have a chief ray 3, which is incident upon an image plane 1, and is parallel with an optical axis 2 and for that end a diaphragm 4 must be provided at a position with a range of approximately ± 0.3f from the object side focal point 5. And the rear lens diameter of the lens is determined by the back focus, F-number and the amount of circumferential light and the larger the latter elements, the more the rear lens diameter increases. Therefore, especially in a so-called retro-telecentric type lens, to which a retro-focus type lens system having a back focus longer than the focal distance is applied, it is unavoidable that the rear lens diameter becomes excessively large. Thus, as a result of the lens diameter becoming large, a high degree of correction of aberration becomes difficult, and lateral aberration frequently takes place. FIG. 2 shows an example of the aberration of such conventionally known retrotelecentric lens as mentioned above, and as shown in this drawing, in a small angle that is at a central part of image plane many times inward, coma takes place, while in a large angle, that is at circumferential part of the image plane outward, coma takes place many times.

SUMMARY OF INVENTION

The present invention intends to correct these aberrations, and to that end, when a marginal ray penetrates through a convergent lens system 6 (FIG. 1) in the rear group, as the penetrating ray takes zigzag path within each lens element forming a convergent lens system, being given the tendency of convergence or divergence, the height of the path from the optical axis is made to pass through the minimum position as much as possible.

DESCRIPTION OF PREFERRED EMBODIMENTS

Figure 1:
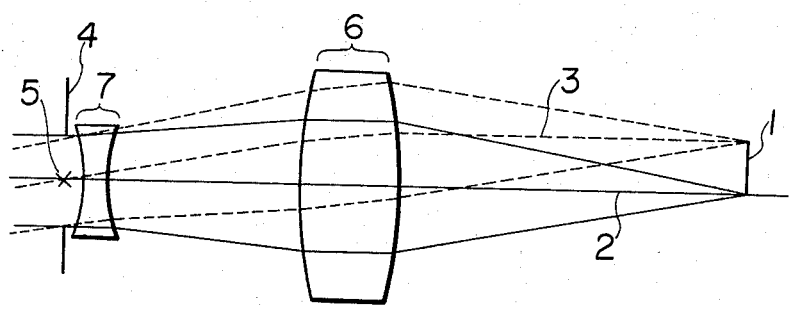
FIG. 1 is a cross-sectional view of a telecentric lens belonging to prior art.
Figure 2:
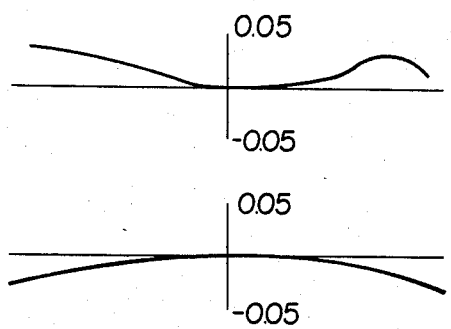
FIG. 2 is a drawing for its lateral aberration.

Now the principle of the present invention will be explained. While the Petzval sum and the back focus of the total lens system are made constant, a member 8 which satisfies the conditions (1) and (2) shown below is provided between a front group 7 of divergent nature and a rear group 6 of convergent nature.

$$0.1f \leqq d \leqq 0.5f \qquad (1)$$

$$|\phi| \leqq 0.5/f \qquad (2)$$

In the above conditions, f is a focal distance of the total lens system, d is a synthesized thickness on axis of the member 8 and $\phi$ is the power of the member (inverse number of the synthesized focal distance).

Figure 4:
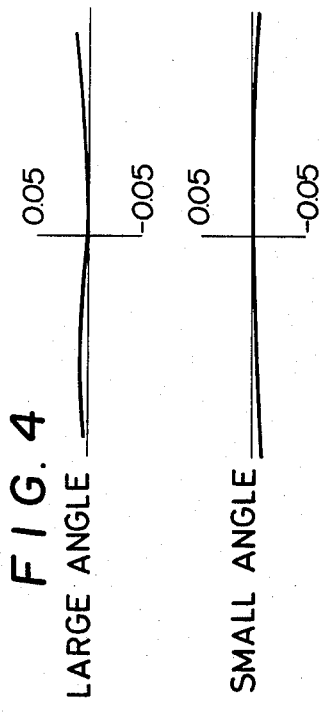
FIG. 4 is a drawing for its lateral aberration.

As a result of the above, the marginal ray in the rear group 6 can be made low and as shown in FIG. 4, lateral aberration is satisfactorily corrected for in small angle and for large angle. In the above conditions, for example as the lower limit of the condition (1) is exceeded, the marginal ray at the rear group can not be sufficiently lowered and inward coma takes place many times at small angle while outward coma takes place many times at large angle. On the other hand when the upper limit is exceeded, the marginal ray at the rear group becomes too low, breaking the balance of lateral aberration, and inward coma takes place many times both at large angle and small angle. Next, about the condition (2) the Petzval sum and the back focus can not be made constant outside of the above mentioned limit, and other aberrations than lateral aberration take place, breaking the total balance, thus it becomes impossible to correct aberration with high degree.

Figure 3:
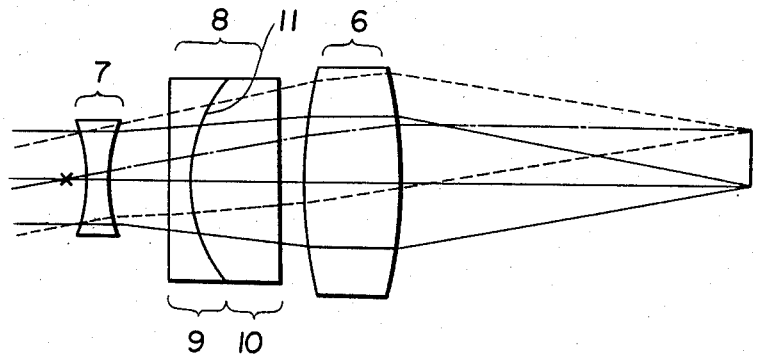
FIG. 3 is an outline figure of a lens which embodies the principle of the present invention.

However, with the above conditions only the difference between the reference wavelength and other wavelength in lateral aberration that is color aberration will take place. For example inward coma takes place in the ray with shorter wavelength than the reference wavelength, while outward coma takes place in the ray with longer wavelength than the reference wavelength. Therefore, in order to solve this problem, a cemented surface 11 with its convex surface facing to an object side is provided in the member which satisfies the conditions (1) and (2), and said member 8 (FIG. 3) is divided to a lens system 9 at an object side and a lens system 10 at an image side and the following condition (3) is provided therefor:

$$-\frac{0.02}{f} \leqq \frac{\phi_1}{\nu_1} + \frac{\phi_2}{\nu_2} \leqq \frac{0.03}{f} \qquad (3)$$

In the above condition, $\phi_1$ is power of the lens system 9 at an object side; $\gamma_1$ is Abbe number of this lens system 9; $\phi_2$ is power of the lens system 10 at the image side; $\gamma_2$ is Abbe number of this lens system 10. As a result, a marginal ray other than of the reference wavelength, penetrating through the convergent lens system at the rear group can be adjusted, thus color difference in lateral aberration can be satisfactorily corrected. When the lower limit of condition (3) is exceeded, outward coma takes place many times at the ray with shorter wavelength than the reference wavelength, while inward coma takes place many times in the ray with longer wavelength than the same. On the other hand when the upper limit is exceeded inward coma takes place in the ray with shorter wavelength and outward coma takes place in the ray with longer wavelength, thus it is difficult in both cases to satisfactorily correct the color difference in lateral aberration.

While the cemented plane between the front lens system and the rear lens system into which the member is divided is so provided that its convex surface faces to an object side, it is possible that said convex surface is faced to the image side. However as moving from small angle to large angle it is very effective to have the convex surface face to an object side in order to keep the balance of lateral aberration in satisfactory manner. Also, while the cemented part between the front lens system and the rear lens system may have the thickness zero or may have a very slight air layer, it is effective to cement both parts for aberration correction. Also it is naturally possible to form the front lens system or the rear lens system, which form the above mentioned member, by combination of several optical elements, respectively, so that a high degree of aberration correction can be done.

Figure 5:
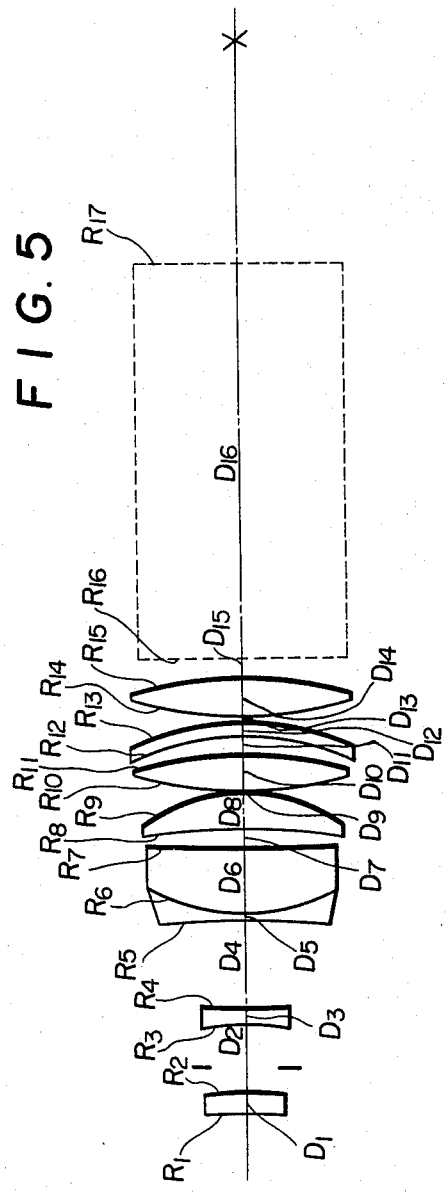
FIG. 5 is a cross-sectional view to show a concrete example of the present invention.
Figures 6A, 6B, 6C, 6D:
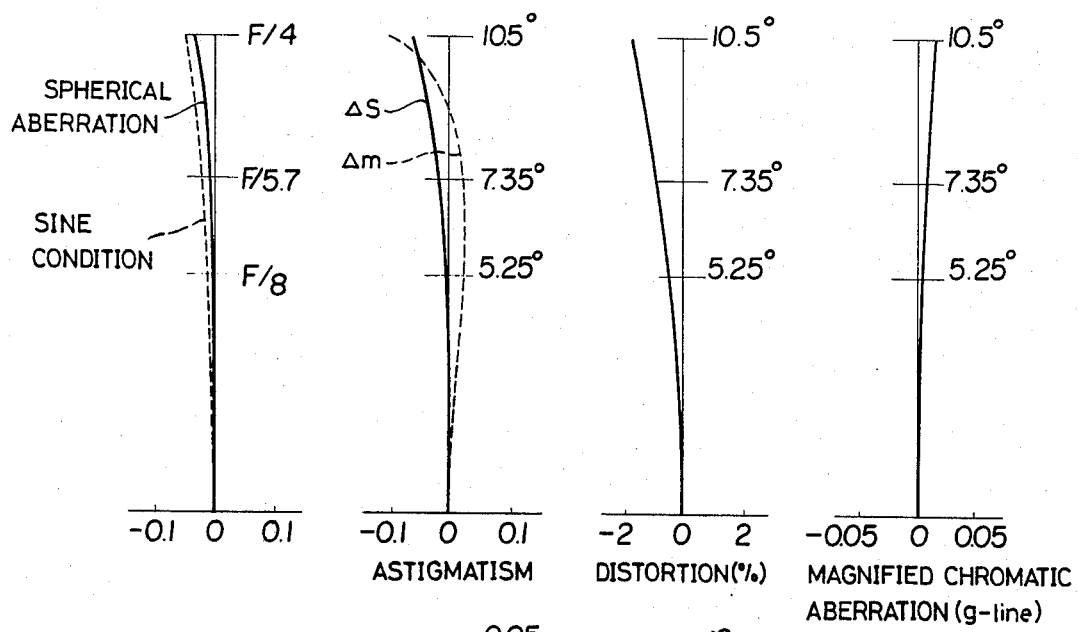
FIG. 6A through FIG. 6E are drawings for various aberrations based on the values of the present invention.
Figure 6E:
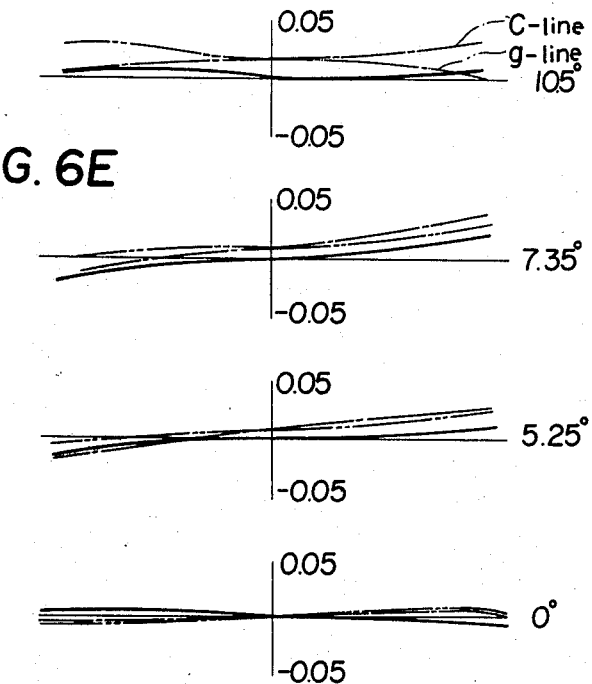

Next, an example of the present invention will be shown in FIG. 5. Table 1 shows examples of the value according to FIG. 5, while Table 2 shows its third order main-aberration coefficients. FIG. 6A through FIG. 6E are drawings for various aberrations.

Such range of the condition equations (2) and (3) as being allowed without too much change in the lens composition in the example is shown below. For the equation (1) what has been described above will apply.

$$-\frac{0.25}{f} \leq \phi \leq \frac{0.1}{f}$$

$$-\frac{0.0032}{f} \leq \frac{\phi_1}{\nu_1} + \frac{\phi_2}{\nu_2} \leq \frac{0.014}{f}$$

As has been explained above, the present invention is quite useful as it is to provide such an optical member as satisfying the conditions (1), (2) (3) between a divergent lens system and a convergent lens system to have a marginal ray penetrate through the convergent lens system with the optimum optical path, so that lateral aberration is satisfactorily corrected.

Table 1

| | f = 100  bf* (back focus) = 163.7 FNO. 1 : 4   angle of field 21° | | | |
|---|---|---|---|---|
| radius of curvature | lens thickness and distance | refractive index (d ray) | Abbe number | |
| $R_1$  −162.58 | $D_1$  6.7 | $N_1$ 1.76182 | $\nu_1$ 26.6 | |
| $R_2$   − 84.77 | $D_2$  23.2 | | | |
| $R_3$   − 42.475 | $D_3$  4.6 | $N_2$ 1.713 | $\nu_2$ 54 | |
| $R_4$   462 | $D_4$  27.9 | | | |
| $R_5$  −420. | $D_5$  3.5 | $N_3$ 1.48749 | $\nu_3$ 70.1 | |
| $R_6$   71.5 | $D_6$  22.4 | $N_4$ 1.51118 | $\nu_4$ 51 | |
| $R_7$  1013. | $D_7$  5.9 | | | |
| $R_8$  −210.5 | $D_8$  11.8 | $N_5$ 1.48749 | $\nu_5$ 70.1 | |
| $R_9$   − 53.3 | $D_9$  0.2 | | | |
| $R_{10}$  215.9 | $D_{10}$  12.4 | $N_6$ 1.43387 | $\nu_6$ 95.1 | |
| $R_{11}$  −111.84 | $D_{11}$  6.4 | | | |
| $R_{12}$   − 76.6 | $D_{12}$  3.5 | $N_7$ 1.75520 | $\nu_7$ 27.5 | |
| $R_{13}$  −151.61 | $D_{13}$  0.2 | | | |
| $R_{14}$  122.27 | $D_{14}$  13.5 | $N_8$ 1.43387 | $\nu_8$ 95.1 | |
| $R_{15}$  −187.27 | $D_{15}$  8.2 | | | |
| $R_{16}$   ∞ | $D_{16}$  130. | $N_9$ 1.51633 | $\nu_9$ 64.1 | |
| $R_{17}$   ∞ | | | | |

*Value as $N_9$ is eliminated.

Table 2

| | I | II | III | P | V |
|---|---|---|---|---|---|
| $R_1$ | −0.0571 | 0.1002 | −0.1758 | −0.2660 | 0.7752 |
| $R_2$ | 1.6487 | −1.1341 | 0.7801 | 0.5101 | −0.8875 |
| $R_3$ | −5.0468 | 1.3268 | −0.3488 | −0.9800 | 0.3494 |
| $R_4$ | −1.6856 | −1.5604 | −1.4446 | −0.0901 | −1.4207 |
| $R_5$ | 0.6747 | 0.8472 | 1.0639 | −0.0781 | 1.2379 |
| $R_6$ | 0.8717 | 0.5369 | 0.3307 | 0.0147 | 0.2127 |
| $R_7$ | −3.0961 | −2.8685 | −2.6577 | −0.0334 | −2.4933 |
| $R_8$ | 0.4189 | 0.6212 | 0.9210 | −0.1557 | 1.1347 |
| $R_9$ | 10.1954 | 3.8020 | 1.4178 | 0.6149 | 0.7580 |
| $R_{10}$ | 0.4706 | 0.5330 | 0.6036 | 0.1401 | 0.8422 |
| $R_{11}$ | 7.3734 | 2.5469 | 0.8798 | 0.2706 | 0.3973 |
| $R_{12}$ | −16.8244 | −6.9486 | −2.8698 | −0.5618 | −1.4173 |
| $R_{13}$ | 0.6298 | 0.0621 | 0.0061 | 0.2838 | 0.0286 |
| $R_{14}$ | 0.8955 | 0.9399 | 0.9865 | 0.2475 | 1.2951 |
| $R_{15}$ | 4.0114 | 1.3078 | 0.4264 | 0.1616 | 0.1917 |
| $R_{16}$ | −0.8782 | −0.0361 | −0.0015 | 0. | −0.0001 |
| $R_{17}$ | 0.3955 | 0.0162 | 0.0007 | 0. | 0. |
| Σ | −0.0026 | 0.0925 | −0.0818 | 0.0784 | 1.0040 |

The diaphragm is positioned at 0.01f from the focal point at an object side towards the object side.

What is claimed is:

1. A retro-telecentric lens comprising a divergent lens group at an object side and a convergent lens group having a plurality of lenses at an image plane side, wherein the back focus of the total lens is longer than the focal distance and the aperture almost coincides with the position of the focal point at the object side, and wherein an optical member consisting of a plural number of lenses having different dispersion for correcting coma aberration is positioned between said divergent lens group and the convergent lens group and wherein said optical member includes two lenses and the adjoining surface of said lenses is convex at an object side, and both lenses are cemented together and wherein a positive lens element is arranged at the nearest position to said optical member within said convergent lens group and wherein said optical member satisfies the following equations:

$$0.1f \leq d \leq 0.5f$$

$$-\frac{0.25}{f} \leq \phi \leq \frac{0.1}{f}$$

$$\frac{-0.0032}{f} \leq \frac{\phi_1}{\nu_1} + \frac{\phi_2}{\nu_2} \leq \frac{0.014}{f}$$

wherein $d$ is synthesized thickness on axis of said optical member, $\phi$ is a synthesized power of the member, $\phi_1$ is the power of a front lens system which forms the member, $\nu_1$ is its Abbe number, $\phi_2$ is the power of a rear lens system which forms the member, $\nu_2$ is its Abbe number, and $f$ is the focal distance of the total lens system.

2. A retro-telecentric lens comprising a divergent lens group at an object side and a convergent lens group at an image plane side, wherein the back focus of the total lens is longer than the focal distance and the aperture almost coincides with the position of the focal point at the object side and wherein an optical member consisting of a plural number of lenses having a different dispersion for correcting coma aberration is positioned between said divergent lens group and the convergent lens group and wherein the optical member contains two lenses with an adjoining cemented surface, said adjoining cemented surface being convex at the object side and wherein said lens is constructed in accordance with the following table:

| | f = 100  bf* (back focus) = 163.7 FNO. 1 : 4   angle of field 21° | | | |
|---|---|---|---|---|
| radius of curvature | lens thickness and distance | refractive index (d ray) | Abbe number | |
| $R_1$  −162.58 | $D_1$  6.7 | $N_1$ 1.76182 | $\nu_1$ 26.6 | |
| $R_2$   − 84.77 | $D_2$  23.2 | | | |
| $R_3$   − 42.475 | $D_3$  4.6 | $N_2$ 1.713 | $\nu_2$ 54 | |
| $R_4$   462. | $D_4$  27.9 | | | |
| $R_5$  −420. | $D_5$  3.5 | $N_3$ 1.48749 | $\nu_3$ 70.1 | |
| $R_6$   71.5 | $D_6$  22.4 | $N_4$ 1.51118 | $\nu_4$ 51 | |
| $R_7$  1013. | $D_7$  5.9 | | | |
| $R_8$  −210.5 | $D_8$  11.8 | $N_5$ 1.48749 | $\nu_5$ 70.1 | |
| $R_9$   − 53.3 | $D_9$  0.2 | | | |
| $R_{10}$  215.9 | $D_{10}$  12.4 | $N_6$ 1.43387 | $\nu_6$ 95.1 | |
| $R_{11}$  −111.84 | $D_{11}$  6.4 | | | |
| $R_{12}$   − 76.6 | $D_{12}$  3.5 | $N_7$ 1.75520 | $\nu_7$ 27.5 | |
| $R_{13}$  −151.61 | $D_{13}$  0.2 | | | |
| $R_{14}$  122.27 | $D_{14}$  13.5 | $N_8$ 1.43387 | $\nu_8$ 95.1 | |
| $R_{15}$  −187.27 | $D_{15}$  8.2 | | | |
| $R_{16}$   ∞ | $D_{16}$  130. | $N_9$ 1.51633 | $\nu_9$ 64.1 | |
| $R_{17}$   ∞ | | | | |

*Value as $N_9$ is eliminated.

* * * * *